United States Patent [19]

Dahlstrom

[11] 4,166,543
[45] Sep. 4, 1979

[54] METHOD AND MEANS FOR CONTROLLING AN INDUSTRIAL ROBOT

[75] Inventor: Lars Dahlstrom, Vasteras, Sweden
[73] Assignee: ASEA Aktiebolag, Vasteras, Sweden
[21] Appl. No.: 823,067
[22] Filed: Aug. 9, 1977
[30] Foreign Application Priority Data
Aug. 13, 1976 [SE] Sweden .................................. 7609062
[51] Int. Cl.² ............................................... B25J 9/00
[52] U.S. Cl. ..................................... 414/749; 414/744; 414/786; 318/601; 318/603
[58] Field of Search ................. 214/1 CM, 1 BB, 152; 418/601, 603

[56] References Cited
U.S. PATENT DOCUMENTS
4,070,561  1/1978  Shunichi ...................... 214/1 CM X Primary Examiner—Francis S. Husar
Assistant Examiner—George F. Abraham
Attorney, Agent, or Firm—Pollock, Vande Sande & Priddy

[57] ABSTRACT

Robot control with programmed positioning modified by a sensor sensing position error, force or the like. To maintain flexibility, the sensor axis need not coincide with any of several degrees of freedom of the robot. To employ sensor generated signals to modify programmed positioning where sensor and robot degrees of freedom are different, a normalized correction is computed relating a sensor output to each axis of freedom. Merely multiplying sensor output with the appropriate normalized correction provides a quantity in the proper coordinates for correction or position modification, as desired. Further, the robot includes apparatus to change direction of motion under certain circumstances, i.e., a collision with an obstruction. This allows the robot to move around obstructions whose location and extent were unknown at the time of movement programming.

22 Claims, 8 Drawing Figures

METHOD AND MEANS FOR CONTROLLING AN INDUSTRIAL ROBOT

FIELD OF THE INVENTION

The present invention relates to a method for controlling an industrial robot with an arm which is movable in more than one degree of freedom, and with at least one transducer for sensing deviations of the robot arm in a definite sensing direction for each transducer. The invention also relates to a means for carrying out the method.

BACKGROUND

The field of application for current industrial robots is limited. In one typical application, collection and delivery points must be well-defined. Another application, machining of workpieces, requires that the workpieces be identical.

These and other limitations can be reduced by the introduction of so-called sensor control. "Sensor control" is a method of control in which information from transducers (sensors) on the robot arm is used for controlling the arm. Such transducers may, for example, be arranged to sense the forces exerted on the robot, or the deviation in the position of a robot arm from a contour or an object. An industrial robot having sensor control is the subject of U.S. Pat. application Ser. No. 692,553, filed June 3, 1976, now U.S. Pat. No. 4,076,131 the subject matter of which is incorporated by reference.

The introduction of sensor control has so far been restricted as a result of increased complexity of the control system. Generally, the sensing directions of transducers do not coincide with the directions of movement (degrees of freedom) of the robot. Accordingly, a complicated coordinate transformation must be made between the coordinate system of the transducers and the coordinate system of the robot itself.

In point-to-point control, the complexity of the control system is substantially independent of the geometry of movement of the robot arm if the displacement is performed along a smooth even curve line.

On the other hand, if either the displacement is prescribed (i.e., rectilinear), or is to be influenced by signals from sensors, the geometry of movement of the robot arm will greatly influence the complexity of the control system.

Of the four most frequently used coordinate systems for robots—Cartesian, cylindrical, spherical and anthropomorphic—the anthropomorphic system is the most complex one from the point of view of control.

A robot with an anthropomorphic coordinate system is disclosed in the above-mentioned U.S. Pat. application Ser. No. 692,553, see FIG. 1.

The difficulty in achieving a certain control function depends on the relation between displacement in a coordinate and the control signal, as well as the type of coordinate system.

Generally, for sensor control, the output signal from a sensor (one dimensional) is used for simultaneous correction or control of several of the coordinate axes of the robot.

The n-dimensional correction (n=number of degrees of freedom of the robot system) of robot movement corresponding to the sensor signal, may in principle be calculated if the following is known:

sign and amount of sensor signal
the relation between sensor signal and displacement
the orientation of the sensor
the position of the robot arm.

Generally, such a calculation, especially in anthropomorphic coordinate systems, requires a very high calculational capacity of the control equipment because of the complicated coordinate transformations.

The possibility of introducing sensor control without essentially influencing the complexity of the control system depends on the choice of sensors, the relation between their sensing directions and the robot movement coordinate system.

It is important to arrange the apparatus so that flexibility in applying different sensor functions is facilitated.

The present invention aims to provide a control method including sensor control, which considerably reduces the required calculating capacity of the control system.

SUMMARY OF THE INVENTION

A control method according to the invention is characterized in that (a) the robot arm is placed in a position within an intended operating range, (b) the robot arm is displaced a certain distance in a predetermined direction which has a component in the sensing direction of a transducer, and (c) the robot coordinates, expressed in the coordinate system of the robot at the beginning and end of said displacement are sensed and stored; and, (d) during operation of the robot within the intended operating range and upon a deviation sensed by a transducer, the changes in the robot coordinates, which are required for correcting the deviation, are calculated using said stored values.

A means for carrying out the invention is characterized by the fact that it comprises a memory for storing the coordinates for robot displacement, arithmetic processing apparatus is provided which, during operation of the robot, is supplied with a signal corresponding to said deviation and, guided by this signal and the stored values, calculates desired changes in robot coordinates; as well as members for moving the robot arm in the direction of each coordinate by an amount corresponding to said change.

BRIEF DESCRIPTION OF THE DRAWINGS

The present invention will now be described so as to enable those skilled in the art to make and use the same in connection with the attached drawings in which like reference characters identify identical apparatus and in which.

DETAILED DESCRIPTION OF A PREFERRED EMBODIMENT

The method is analogous to the so-called training method which is normally used for programming the movement pattern of a robot controlled by point-topoint control (i.e., the robot is run manually to the point that is to be entered into the program).

By programming a number of points and information characterizing the points, the relationship between the desired correction (displacement) and the control signal in the coordinates of the robot can be defined in a simple manner. This relationship applies, in general, only within a limited part of the operating range of the robot, for example, 10–25%.

Figure 1:
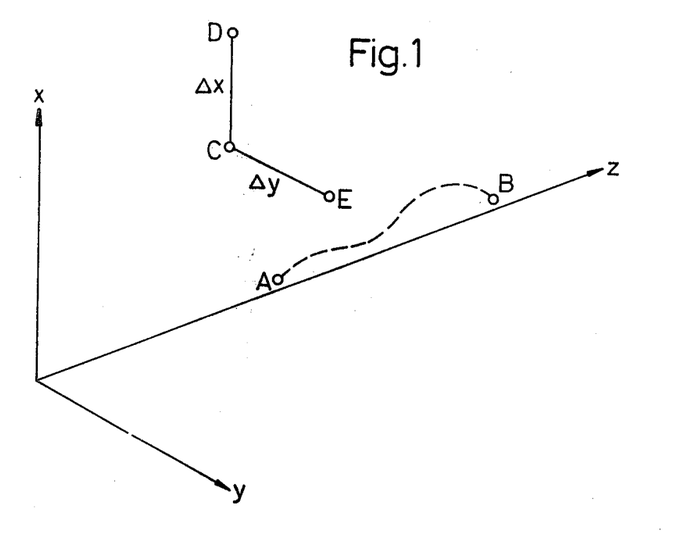
FIGS. 1, 2, 3A, 3B, 3C and 3D illustrate various desired travel paths for a robot arm, with associated coordinate axes for sensing transducers and the manner in which transducer signals in those coordinates can be used for a robot arm having degrees of freedom in coordinates other than those of the sensing transducers.

The method of programming and employing correction vectors can be most easily described, in principle, by way of an example:

Let it be assumed that we desire the robot hand (the tool) to follow a curved line, which is not known in detail in advance, between two programmed points A and B, see FIG. 1. With prior art control techniques, a number of points on the curved line would have to be programmed in order to enable the arm to follow the line. The invention achieves this movement without requiring programming of various points on the line. We assume in this connection that the robot arm or the tool attachment (the robot hand) of the robot is provided with two sensors registering in two directions perpendicular to each other. Further, we assume that points A and B lie in a common z-axis plane of a right-angled coordinate system and that the robot transducers are arranged so that the sensing directions of the sensors are parallel with the x- and y-axes, respectively.

The sensors (the transducers) may, for example, constitute one unit in accordance with the disclosure of the above-mentioned U.S. Pat. application Ser. No. 692,553, which senses the force that influences the robot hand in two directions perpendicular to each other and the deviation in position of the robot arm, corresponding to the force, in the two directions mentioned. The sensors deliver output signals $S_x$ and $S_y$, the magnitudes of which correspond to the magnitude of the deviations in the x- and y-directions, respectively.

During the movement of the robot arm between A and B, deviations in position in the x- and y-directions, respectively, are to be corrected by corrections in the x-direction and the y-direction corresponding to sensor signals $S_x$ and $S_y$.

In order for the control system to be able to carry out the correction, the system must be provided with information as to how the transformation of coordinates between the right-angled coordinate system of the sensors and the coordinate system $(\alpha, \theta, \rho)$ of the robot is to be carried out.

For an arbitrary point $(\alpha_0, \theta_0, \rho_0)$ within the operating range of the robot the coordinate transformation $$\Delta x \triangleq (\Delta\alpha, \Delta\theta, \Delta\rho)\alpha_0, \theta_0, \rho_0$$

and $$\Delta y \triangleq (\Delta\alpha, \Delta\theta, \Delta\rho)\alpha_0, \theta_0, \rho_0$$

can be obtained in a simple way through the inventive mtthod.

(The symbol $\triangleq$ means "corresponds to" and, for example, the first expression means that a displacement $\Delta x$ in the x-direction at point $\alpha_0, \theta_0, \rho_0$ corresponds to the displacements $\Delta\alpha, \Delta\theta, \Delta\rho$ in the $\alpha$-direction, the $\theta$-direction and the $\rho$-direction.)

According to the invention, the robot is run manually to point C (see FIG. 1) where the actual value of the robot arm position is stored as well as the argument. The argument indicates that point C constitutes the origin of the coordinate transformation. The robot is then moved to point D. Points C and D are chosen so that they are positioned on a line which is parallel to the x-axis.

The distance CD need not be exactly parallel to the x-axis, but it suffices if CD has a component in the x-direction. In practice, the direction of the movement CD can be chosen fairly approximately. (The same is true of the movement CE in relation to the y-axis).

When the actual value of the robot arm position is stored in point D, an argument is entered which indicates, on the one hand, that $$\Delta x \triangleq (\Delta\alpha, \Delta\theta, \Delta\rho)\alpha_C, \theta_C, \rho_C$$

is to be calculated, and also indicates the "time" of the displacement as in ordinary position programming.

The length $\Delta x$ of the displacement CD may, for example, be determined by means of a measuring device. Another possibility is to use the sensor signal $S_x$ directly as a measure of $\Delta x$. The changes $(\Delta\alpha, \Delta\theta, \Delta\rho)$ in the robot coordinates which are caused by the displacement CD are also known now since the coordinates of the points C and D (in the coordinate system of the robot) are known and stored. In this way, the changes in the robot coordinates, which are required to correct a deviation $\Delta x$ in the x-direction in the coordinate system of the sensor, are determined in principle.

In certain cases, depending among other things on the design of the control function (e.g., integrating), it is not necessary to determine exactly, or at all, the magnitude of the displacement $\Delta x$ in the x-direction. It is sufficient that a displacement in the x-direction is made and that the changes in the robot coordinates $(\alpha, \theta, \rho)$ which are caused by the displacement, are stored, for example, by storing the coordinates for points C and D. In this way, the relationships between the changes $(\Delta\alpha, \Delta\theta, \Delta\rho)$ in the robot coordinates, which are required to cause a displacement in the x-direction, become known.

Since the coordinate transformation in general is a function of $\alpha, \theta, \rho$, the result obtained applies only at point C, but to a reasonable approximation may be used within a limited range around point C.

The incremental correction dx is determined by $$dx = \frac{\Delta x}{\text{number of increments}} =$$

$$\frac{\Delta x}{\text{constant} \times \text{programmed time}} =$$

$$\frac{1}{\text{constant} \times \text{programmed time}} (\Delta\alpha, \Delta\theta, \Delta\rho)\alpha_C, \theta_C, \rho_C.$$

That is, by the choice of $\Delta x$ and programmed time, dx may be standardized in the desired manner.

Thereafter during control of the robot an incremental displacement $$= \frac{\text{total distance}}{\text{number of increments}}$$

is added to the desired value register of the robot position servo at each sampling interval, which may be, for example, 10 milliseconds.

In case of an error signal from the x sensor, a number of incremental corrections are added to the incremental displacement at each sampling interval. The number of corrections is dependent on the magnitude of the sensor signals and the desired control function.

The same procedure is followed in the y-direction. The robot arm is moved a certain distance in a direction which is suitably approximately parallel to the y-axis of the sensor, for example, the distance CE in FIG. 1. The corresponding values are stored as for a displacement in x-direction, and the corrections in the robot coordinates which are to correct a deviation in y-direction are thus determined.

When the robot is operated within the intended range of work, for example, if the robot is to carry a tool for machining the known contour of a plate (the dash-lined curve of FIG. 1), the robot tool is moved in the principal direction AB in FIG. 1. Since the contour deviates from the line AB which the robot would follow without correction, the sensors will sense deviations in x-direction and y-direction. With the guidance of the values which were initially stored in the manner described above for the displacements in x-direction and y-direction (CD and CE, respectively), the changes in the robot coordinates ($\alpha$, $\theta$, $\rho$) which are required to correct the deviations caused by the sensors, are calculated. These calculated corrections are added to the displacement in the principal direction AB. By a suitable choice of control function (e.g., integrating) the robot arm/tool can then be controlled so that the contour, which was unknown beforehand, is carefully followed during the displacement. This movement is realized, according to the invention, in a most advantageous manner because the programming of the robot is very simple and the control can be carried out with limited calculating capacity.

The sensor control described above will be referred to in the following as sensor control during normal positioning.

The control can be supplemented by the use of a transducer which senses the presence of an object or an obstruction in the direction of movement. To effect this in the example of FIG. 1 a third transducer having a sensing direction in z-direction is provided in addition to the two transducers with the sensing directions in x- and y-directions. This third transducer can be used to stop the movement of the robot arm during displacement in the z-direction, for example, when the arm reaches an obstruction. The transducer can also be used to correct the position of the arm in z-direction in a desired manner in dependence on the output signal of the transducer. During programming, therefore a displacement $\Delta z$ in z-direction is made and the changes in the robot coordinates ($\alpha$, $\theta$, $\rho$) which are caused by this displacement are stored. In this way, as described above (regarding the x-direction) it is known how the robot coordinates should be modified to obtain a correction of the position of the arm in z-direction on the occurrence of a deviation/transducer signal from the transducer sensing in the z-direction.

The invention has been described above in connection with transducers which sense the deviations in the position of the robot arm/tool or the workpiece. However, the invention may just as well be applied to other types of transducers which sense other vectorial quantities, such as force or speed.

In the case of simultaneous signals from several transducers the changes in the respective coordinates, which result from the different transducer signals, are added for each robot coordinate.

A more advanced sensor control, called automatic contour tracking (curve tracking), can also be achieved.

A method of programming this sensor control will be described, in principle, in the following by way of an example.

Figure 2:
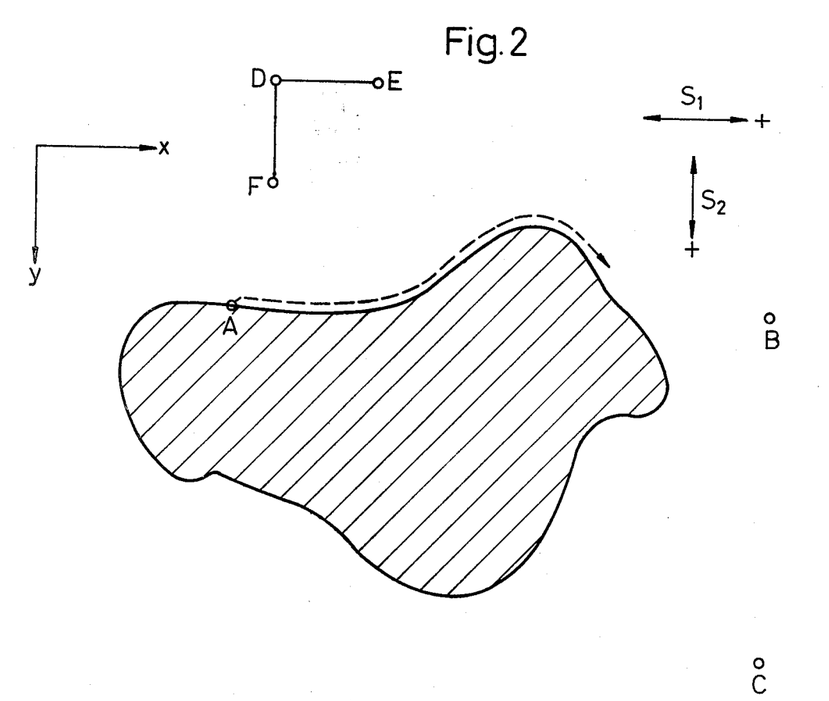

We assume that we wish the robot hand to follow a contour which is not known beforehand (see FIG. 2). We further assume that the robot hand is located at point A and that it has been provided with two sensors $S_1$ and $S_2$ sensing in two directions, perpendicular to each other, which are parallel to the x- and y-directions, respectively, of FIG. 2. The sensors are designed so that they indicate the amount and the sign of the error (e.g., error in position or pressure) and the direction to the contour ($\pm$). A signal is further obtained if the error signal does not lie within given limit values.

Programming is accomplished as follows:

The robot is manually moved to point A, and the actual value is stored. Thereafter, it is moved to point B. Points A and B lie on a line which is parallel to the x-axis. When the actual value and the time of displacement (from A to B) are programmed in, the instruction specifies a superordinate positioning (principal direction 1). Subsequently, the actual value and the time of displacement is programmed at point C, and it is indicated that the positioning B to C is subordinate (principal direction 2). Points D, E and F define the correction vectors in the x- and y-directions in the manner described above in connection with FIG. 1.

The robot is then returned to point A. Movement is then initiated and the robot proceeds in a direction towards point B.

Figure 3A:
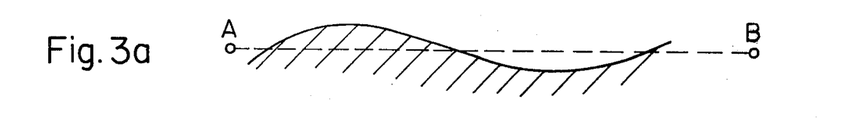
Figure 3B:
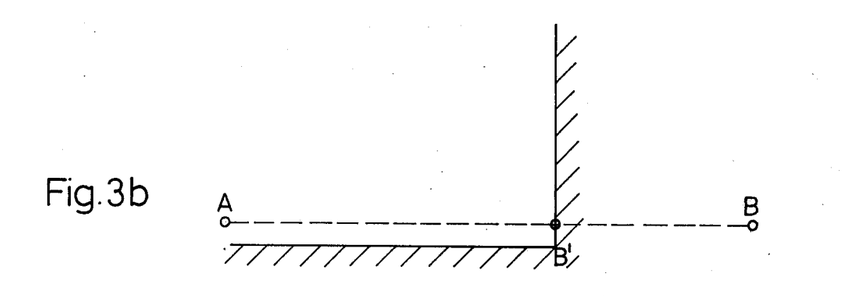
Figure 3C:
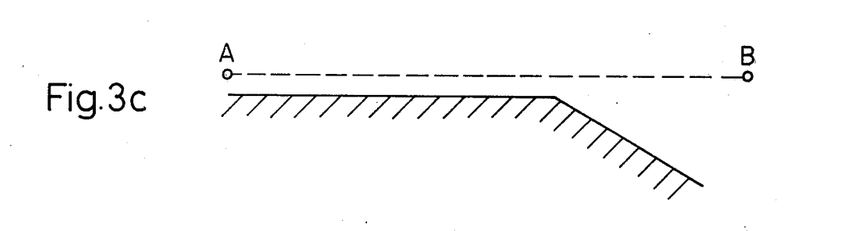
Figure 3D:
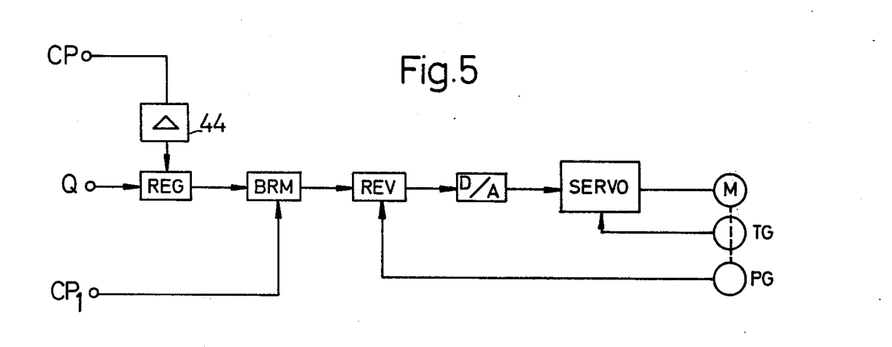

During the displacement the following cases can be distinguished (see FIG. 3):

(a) no corrections or only minor corrections in y-direction; the robot stops at point B (see FIG. 3A);

(b) the robot hand rams into an obstruction at point B', which causes a signal indicating that an error signal from $S_1$ lies outside its range (see FIG. 3B). The transducer $S_1$ acts here as a collision detector. The displacement along A→B ceases. Thereafter exchange of principal direction takes place, that is, the continued displacement takes place along B→C, $S_2$ now acting as a collision detector and $S_1$ as a correction detector, and position corrections are made in the x-direction until the error signal from $S_1$ ceases. The choice of the direction along B→C is determined by the position signal, that is, the position of the contour in relation to $S_2$;

(c) the error signal from $S_2$ lies outside prescribed limit values (see FIGS. 3C and 3D). The displacement along A→B is interrupted. Correction in y-direction is made until the signal lies within the desired range. If this cannot be achieved with a limited number of corrections, an exchange of principal direction takes place, that is, the principal direction is altered to B→C or C→B dependent on the sign of the error signal from $S_2$.

The preceding description illustrates how, in accordance with the invention, a robot can be controlled in response to the transducer signals and how this control can be applied when it is desired that the robot arm or a tool carried by the arm should follow a contour which was previously unknown. The method of control may be used with advantage in industrial robots which are to machine steel sheets or other workpieces having a shape that may be unknown. Examples of such machining processes are grinding, grading and welding. The control method may also be employed for different types of handling, for example, when the robot is used for placing boxes or other objects closely packed adjacent each other. The transducers are then used to sense deviations in position or forces, and according to the method described the transducer signals are transformed to suitable changes of the robot coordinates.

In connection with FIG. 2, there is shown how a robot can be controlled so that it follows a two-dimensional contour, for example, the edge of a plane sheet, where the x and y axes of the transducers are positioned in the plane of the sheet. To make it possible to follow a three-dimensional contour, for example, in the case where the sheet inclines in relation to the x-y planes of the transducers, a third transducer may be arranged to sense deviations in position in z-direction (perpendicular to the paper plane in FIG. 2), the output signal of the transducer is supplied to the control system of the robot in such a way that the "height position" of the robot arm/tool (the position in z-direction) is corrected. When programming the robot a displacement in z-direction must be made, and in the manner described above, the relationship between an error in z-direction sensed by the transducer and necessary changes of the robot coordinates is obtained.

Figure 4:
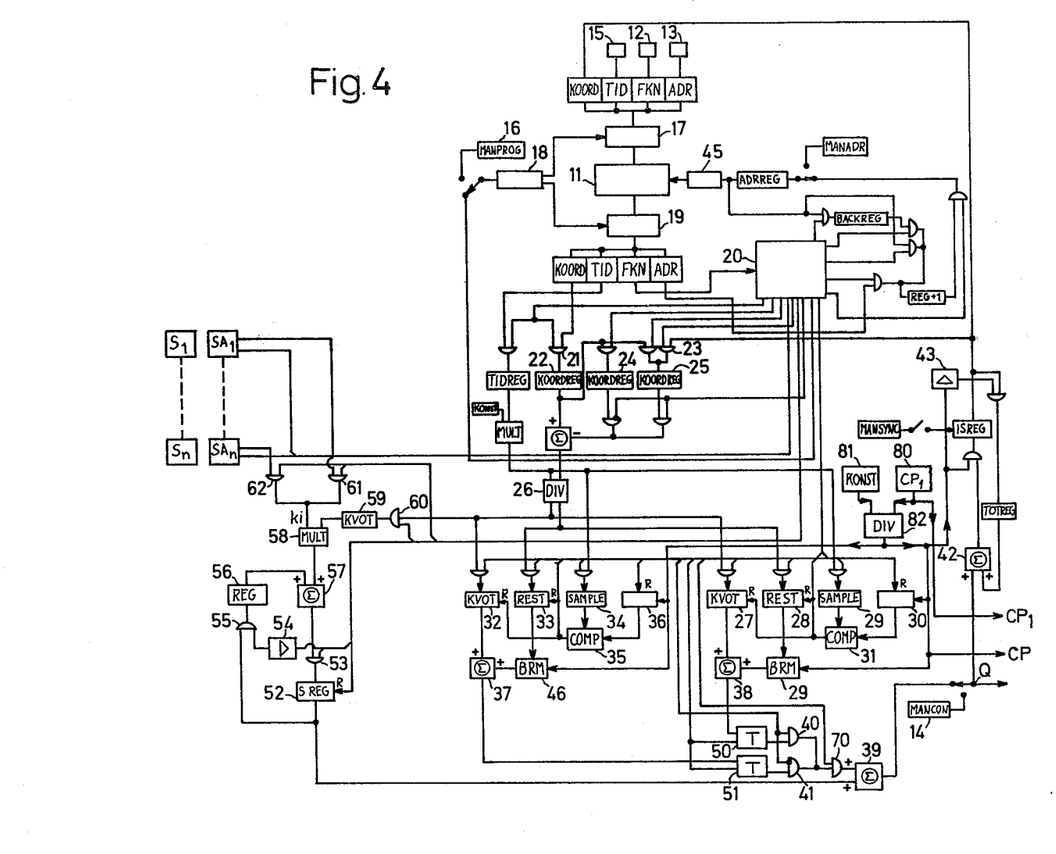
FIG. 4 is a block diagram of the apparatus to provide position correction signals in the various axes of robot arm movement.
Figure 5:
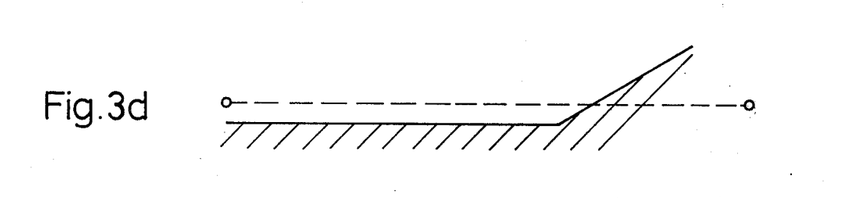
FIG. 5 is a block diagram of the manner in which the signals generated by the apparatus of FIG. 4 can actually be employed to drive the position of a robot arm.

Referring now to FIGS. 4 and 5, an embodiment of a program control means and a position servo will be described, intended for a manipulator to be utilized for generation of a complex movement pattern.

The apparatus shown in FIG. 4 comprises a plurality of well known components for which the block diagram disclosure is adequate. Instructions defining the programmed movements are stored in memory 11. Inputs to the memory 11 are provided through write circuits 17 from an input register having sections denoted KOORD, TID, FKN and ADR for respectively storing coordinate data, time for movement execution, function and address data. Inputs to the latter three sections of the input register are provided through manually settable switches 15, 12 and 13, respectively. Write circuits 17 and read circuits 19 are controlled through a control device 18, either automatically from control 20 or through manually operated device 16 termed MAN PROG depending on the position of the switch on the input of control device 18. The address of memory 11 which is written into or read from is obtained from address register ADRREG by addressing circuits 45. MANADR is a manually controlled register for manually selecting a memory address, while BACKREG and REG+1, and the logic gates associated therewith are used to modify current addresses to obtain new addresses in accordance with signals from control 20, which operates in response to function control signals derived from the FKN section of the read register. Control device 20 may comprise a programmable sequence logic system such as, for example, the ASEA PROMATIC 700.

Movements are carried out as follows. The difference between an initial and a final position is determined by a summing device Σ. The final position is provided by register 22 and the initial position is provided from either register 24 or register 25. Registers 24 or 25 derive initial coordinate data from either register 22 or ISREG as determined by control 20 enabling the proper gate. The difference in coordinates is equal to the desired movement and is provided to divider 26 which then divides this quantity by the number of incremental movements with which it will be achieved. The latter quantity is derived from the TIDREG as modified by MULT, which merely multiplies the quantity in TIDREG by a constant obtained from the connected register KONST. The quotient is stored in a KVOT register (27 or 32), the remainder is stored in a REST register (28 or 33), and the dividend is stored in a SAMPLE register (29 or 34). Periodically (as determined by clock pulses CP) the quantity stored in KVOT is added to the quantity derived by binary frequency multiplier BRM from REST which serves to distribute the remainder displacement uniformly over the movement increments. At each cycle, a counter R (30 or 36) is incremented and the instruction is completed when the count in R is equal to the quantity in SAMPLE as determined by comparator COMP (31 or 35) which serves to reset KVOT, REST and SAMPLE and indicates to control 20 that the instruction has been completed. One set of registers, etc. 32–37 and 46 is employed for superordinate movements and the other 27–31 and 38 is employed for subordinate movements. The movement signals are provided by adder 39 which is fed through gate 70 by either gate 40 or gate 41.

Sensor corrections are coupled from a SREG 52 to the summer (or OR gate) 39. These corrections are determined as follows. The sensors $S_1$-$S_n$ produce analog signals which are converted to digital form by the associated converter $SA_1$ to $SA_n$. A normalized sensor correction vector $V_i$ is computed for the relevant sensor by determining the difference between the contents of register 22 and register 24. This is converted to an incremental normalized correction by division, in divider 26, using as the divisor a time quantity from TIDREG provided through MULT. The result is the incremental normalized correction which is stored in KVOT 59. To obtain actual incremental corrections this quantity is multiplied, in multiplier 58, with the digital sensor error signal. The result is summed by adder 57 with any other previous value of SREG 52 through REG 56. The sum is the incremental sensor correction and is supplied once each cycle of the clock to summer 39.

A sensor signal may relate, for example, to a deviation in the x-direction. The correction has components, for example, in $\alpha$, $\theta$ and $\rho$ directions. Similarly, another sensor signal may relate to the y-direction and will also result in correction components in $\alpha$, $\theta$ and $\rho$ directions. To handle such signals, certain of the apparatus of FIG. 4 is time shared and other apparatus is duplicated. The memory read registers, control 20 and addressing circuits and components shown in FIG. 4 above these may be time shared to control movements in all directions. The remaining components below these are duplicated for each of the robot's movement axes, i.e., $\alpha$, $\theta$ and $\rho$, for example (except, of course, the sensors $S_1$-$S_n$ and associated converters $SA_1$-$SA_n$).

A program for the movements of a manipulator consists of a number of instructions which are stored in a memory 11. Several different types of instructions may exist, such as ordering of displacement, reading of input signals, jump to certain instructions, repetition of instruction blocks, and so on.

Common to all instructions is information defining the type of instruction and the instruction number, that is, the address in the memory. When programming, the function is selected by means of switch 12 which is connected to a register element designated FKN and switch 13, connected to a register element ADR selecting the address.

In the following, only the instructions defining the displacement of the robot arm will be dealt with.

In the case of point-to-point control, the movement pattern of the robot is defined by a number of discrete positions. Each such position has a corresponding positioning instruction. The instruction contains, among other things, information about the coordinates of the robot arm in the position and the time for the movement from the preceding position.

The coordinates of the robot arm, that is, the digital values for all the coordinate axes, are normally programmed through the so-called training method, that is, the robot is run manually by means of a member 14, in the figure designated MANCON, to the desired position. The time of displacement from the preceding programmed position is selected by a switch 15 which is connected to a register element designated TID.

By means of a manual control member 16, designated MANPROG, write circuits 17 may be controlled manually by way of a control member for write and read functions 18 so that the values set by the switches 12, 13 and 15 plus further information contained in a further register element marked KOORD are transferred and stored in memory 11. Before programming of a movement pattern is started, the robot arm is brought manually to its synchronizing position, to set an actual value register, designated ISREG, to zero by means of a member MANSYNC.

Selection of instruction for manual operation takes place by a manual address selector unit marked MANADR. Execution of the instructions is performed by MANPROG. In automatic operation the instructions are normally executed consecutively, unless the instruction in question specifies otherwise. When the desired instruction is addressed, read circuits 19 on the output of the memory 11 are actuated (manually or automatically) and information about the intended function is then transmitted to a control unit 20 via a register element FKN.

In manual programming, the actual value is updated and new desired values are coupled to the regulating system of FIG. 5, connected to the circuit of FIG. 4 at point Q.

There are four different classes of positioning instructions, namely normal, superordinate, subordinate and sensor-controlled positioning.

One of the following three functions can be selected in case of normal positioning:

updating coordinate register KOORDREG 22, connected to the control unit 20 and to register elements KOORD, FKN, ADR the latter being connected to read circuits 19. Updating occurs as the control unit 20, transfers the coordinate values stored in memory 11 to the coordinate register KOORDREG 22 via gate 21. In this case the robot arm is not displaced. The transmission of the coordinate value defines a reference point which is utilized when calculating a displacement distance. This makes coordinate transformation possible.

absolute positioning; i.e., the robot arm moves to the programmed position. Prior to movement KOORDREG 22 is updated as the control unit 20 transmits the coordinate values stored in the memory via gate 21, and KOORDREG 25 is updated as the control unit 20 opens gate 23, transferring the contents of the actual value register ISREG. The displacement for each coordinate axis therefore becomes equal to the programmed coordinate value minus the current coordinate value (actual value).

relative positioning; i.e., the robot arm in general does not adopt the programmed position. In this case the displacement for each coordinate axis is equal to the programmed coordinate value minus the contents of the register KOORDREG 25 which is updated before register 22 receives the programmed coordinate value from memory 11.

In each case, the incremental displacement is obtained by dividing the resulting displacement in a divider 26 by the number of increments, that is, the time of displacement expressed in the number of sampling intervals. The number of increments is obtained from time register TIDREG which is connected to a register element TID connected to read circuits 19. The contents of register TID are transmitted to time register TIDREG by the control unit 20. The contents of TIDREG are multiplied in a multiplier MULT by a constant KONST, which provides the number of increments which is equal to the number of sampling intervals.

For the normal movement as described above, the quotient and remainder after division are stored in registers KVOT 27 and REST 28, respectively. The balance is evenly distributed over the time of displacement by a binary frequency multiplier BRM 29. Similar operation occurs for superordinate movements, further described below.

The number of increments obtained from the time register TIDREG is also stored in a register SAMPLE 29 and compared with the contents in a counter 30 by means of a comparator COMP 31, which counter is set to zero at the same time as new values are stored in registers KVOT 27 and REST 28. The counter 30 is incremented once every sampling interval. When the contents of the counter 30 are equal to the number of increments in register SAMPLE 29, registers KVOT 27 and REST 28 are set to zero by means of a signal R and a signal is transmitted to control unit 20. In normal absolute or relative positioning, the instruction is terminated either when the desired number of increments has been made, or when the robot arm has reached the desired position. An instruction updating coordinate register KOORDREG 22 is terminated when the coordinate values from register element KOORD, which are connected to read circuits 19, have been transmitted to register KOORDREG 22.

For superordinate positioning only the functions of absolute or relative positioning can be selected and for subordinate and sensor-controlled positioning only updating of the coordinate registers or relative positioning. A superordinate positioning differs from a normal positioning by the fact that it must be succeeded by at least one subordinate positioning. The instruction for the normal or the last subordinate positioning then contains the address to the instruction block for the sensor-controlled positionings and information as to the number of instructions in the block.

The sensors are designated $S_1$-$S_n$ in FIG. 4 and an arbitrary sensor is designated $S_i$ in the following. Each sensor $S_i$ is connected to a sensor adaptation unit $SA_i$ which converts the sensor signal to a suitable digital signal, which is supplied to multiplier 58 by way of gates, for example 61, 62.

The first instruction in the block of instructions for the sensor-controlled movements is always an updating of coordinate register KOORDREG 22. The last instruction in the block then contains the address to the first. Jump to the instruction block for the sensor-controlled movement takes place immediately after the values for the normal movement have been clocked in (note that the circuit includes a clock pulse generator $CP_1$ which delivers a pulse train to various elements in the circuit) registers KVOT 27, REST 28 and SAMPLE 29, respectively, and in case of superordinate positioning after the values for the superordinate and subordinate positionings have been clocked in to registers KVOT 27, REST 28 and SAMPLE 29, as well as KVOT 32, REST 33 and SAMPLE 34, respectively. The execution of the first instruction in the block is terminated when coordinate registers KOORDREG 22 and 24 have been updated. After that, the first sensor controlled positioning is executed and in sequence thereafter the rest of the sensor-controlled positionings, if there are any more left in the block. The block of instructions with the sensor-controlled positionings are executed once every clock pulse interval (sampling interval).

The first instruction for the sensor-controlled positionings consists of a reference point which defines the origin of coordinates of the correction vectors. The block may contain one or more of these. In addition to these instructions there is a sensor-controlled positioning for each sensor which defines a correction vector $V_i$, corresponding to sensor $S_i$, as well as a fictitious time of displacement $T_i$. With proper parameters, as discussed above, the correction $V_i$ is determined as the difference between the coordinate contained in the instruction and the origin. The instruction also contains the address to the sensor as well as information as to the status of the sensor, that is, if it belongs to a superordinate movement or a normal positioning.

The calculation of the increments for the sensor-controlled positionings takes place by dividing the difference between the contents in coordinate registers KOORDREG 22 and KOORDREG 24 (defining the correction vector) by the number of increments.

The quotient is stored in register KVOT 59, the contents of which are then multiplied by the signal from the sensor adaptation unit $SA_i$ in multiplier MULT 58. The product is added in adder 57 to the contents of register 56, which contains the preceding value of register SREG 52 and the result is stored in register SREG 52. Register SREG 52 is set to zero each time the block of instructions with the sensor-controlled positionings are executed. SREG 52 thus contains, at a certain time, the sum of all sensor corrections during one sampling interval. In this fashion, corrections for one movement axis (i.e., $\theta$) are summed from several sensors (i.e., x, y, etc.).

In normal sensor control the output from adder 38 is connected, through the sign reverser T50 and gates 40 and 70, to adder 39 to which also SREG 52 is connected. Sign reverser T50 does not influence the signal from 38 in this case.

Superordinate sensor-controlled positioning (automatic contour tracking) corresponds to normal sensor-controlled positioning until a stop signal is received from any of the sensors. If a stop signal comes in from a sensor which acts as collision detector, a change of principal direction takes place by the control signal to gates 40 and 41 changing (0→1, 1→0). Further, the new principal direction can be reversed dependent on the position signal from the connected sensor. Reversing of the direction takes place by the signal reversers T50 and 51. At the same time, a first counter in control unit 20 starts and counts the number of sampling intervals in the stop state, that is, until the error signal of the collision detector has ceased. During the stop state only sensor correction takes place, that is, gate 70 is closed by control 20.

If the error signal ceases within a certain number ($N_1$) of sampling intervals, the positioning is started along a new principal direction. In other cases, all positioning of the robot arm is ended.

If a stop signal comes in from a sensor which acts as correcting sensor, gate 70 is closed, the first counter and a second counter, also in control unit 20, (which are counted up for each clock pulse CP) are started. If the error signals have ended when the contents of the second counter are $<N_2$, the positioning goes on along the principal direction which was switched in before the stop state occurred. If the error signal exists when the contents of the second counter $\geq N_2$, exchange of principal direction takes place and the stop state is ended if the sensor which now acts as correction sensor lies within its prescribed range of work. The direction of the new principal direction is determined by the sign of the error signal from the correcting sensor when the stop state occurred.

The ability to change direction on meeting an obstruction allows the robot to circumvent obstructions whose presence were not included in the programmed movement. The output signal from adder 39 is transmitted through point Q to the position servo, as is shown in FIG. 5, and also to actual value register ISREG through an adder 42 which adds the incremental value to the previous total value in register TOTREG after delay by means of a time delaying circuit 43 with respect to the pulse train from clock pulse generator CP.

The control unit 20 in the form of a programmable sequence logic system which operates in accordance with the logic conditions which are substantially given by the principles described above may, for example, consist of an ASEA PROMATIC 700 type of equipment.

Clock pulse generator 80 generates a clock pulse train $CP_1$, which is used for control of various elements in the circuit. The pulse train is supplied to the position servo of FIG. 5 and to a division circuit 82, where the pulse frequency is divided by a constant obtained from unit 81. The constant is selected in in the manner described below in connection with FIG. 5. A second clock pulse train CP is obtained from the division circuit 82 with a lower frequency than the pulse train $CP_1$ and which is supplied to various units of FIG. 4 for control of these units and to the position servo of FIG. 5.

FIG. 5 shows a position servo which receives output signals from point Q in FIG. 4. The function of the position servo is to convert the position of a robot axis, ordered from the circuit according to FIG. 4, into an actual displacement of the robot axis. The signal from point Q is supplied to a register REG in time with a pulse train, delayed by means of a time delay circuit 44, from the clock pulse train CP. The contents of register REG are evenly distributed over a sampling interval with the help of a binary frequency multiplier BRM which is clocked by the clock pulse train $CP_1$. The frequency of $CP_1$ is higher than that of CP by a factor equal to the constant supplied from unit 81 in FIG. 4. This factor is selected equal to the maximum content of register REG of FIG. 5. If, for instance, the maximum content of REG is 128, the constant from unit 81 is selected to be 128. Between each two succeeding pulses CP, the whole content of REG is transmitted to the counter REV by means of the multiplier BRM, and as a binary rate multiplier is used, the pulses supplied to REV will be evenly spaced even if the value in REG is only a fraction of its maximum content. The pulses from BRM thereafter count up a reversible counter REV. In case of constant speed, the pulse transducer PG connected to the system counts the counter down at the same rate. The output signal from counter REV then controls a digital-analog converter D/A.

The output signal from the digital-analog converter D/A, which is the speed reference of the system, thereafter controls a speed servo SERVO of conventional construction of, for example, type PSA 1115 manufactured by Inland Motor Div. The speed servo is connected to a DC motor M with tachometer TG and pulse transducer PG. The tachometer signal is then used as speed feedback to the speed servo SERVO.

The method and means according to the invention are, of course, not limited to the embodiments shown here, but can be varied in many ways within the scope of the following claims.

What is claimed is:

1. A method for controlling movement of an industrial robot with an arm movable with more than one degree of freedom in a robot coordinate system, including at least one transducer for sensing deviations of said arm in a definite sensing direction for each transducer wherein said transducer sensing directions do not correspond to any coordinate in said robot coordinate system, comprising:
   (a) locating said arm in a first position within an intended operating range of said arm;
   (b) displacing said robot arm a distance in a predetermined direction which has a component in said sensing direction of a transducer;
   (c) sensing and storing robot arm coordinates, expressed in said robot coordinate system, of said displacement; and
   (d) correcting robot coordinates during operation within said intended operating range upon sensing deviation sensed by said transducer with a correction calculated based on said stored values.

2. The method of claim 1 for controlling a robot including at least first and second transducers with different directions of sensing, said method step (b) comprising:
   (i) displacing said robot arm a distance in a first predetermined direction with the component in the sensing direction of said first transducer, and
   (ii) displacing said robot arm a distance in a second predetermined direction with a component in a sensing direction of said second transducer.

3. The method of claim 2 in which said two predetermined directions are substantially perpendicular to each other.

4. The method of claim 2 in which each of said predetermined directions substantially coincides with a sensing direction of the associated transducer.

5. The method of claim 1 for displacing said arm between two predetermined points defining movement of said robot arm, said transducers sensing deviation of said robot arm from a desired curved line, wherein said predetermined direction of step (b) is substantially perpendicular to a line through said points.

6. The method of claim 5 in which said industrial robot includes a further transducer, said further transducer sensing deviations in a further direction perpendicular to said predetermined direction, said method including the further steps of:
   displacing said robot arm within said intended operating range, a first distance in a direction having at least a component in said predetermined direction, and displacing said robot arm a second distance in a second direction with at least a component in said further direction wherein said predetermined direction and further direction are perpendicular to each other and to a line from said points.

7. The method of claim 5 in which said robot includes a further transducer having a sensing direction with at least a component in a direction between said predetermined points, which robot is capable of sensing an obstruction in a direction of movement comprising the further steps of:
   monitoring a signal from said further transducer, and terminating a movement between said predetermined points on a predetermined output from said further transducer.

8. A method according to claim 1 for directing said robot to follow a complex contour which includes a further transducer, comprising the steps of:
   storing coordinates for two points defining a superordinate displacement of said robot arm, in which the sensing direction of said at least one transducer, has a component in said superordinate displacement direction
   storing coordinates for two further points defining a subordinate displacement of said robot arm in a direction which differs from said superordinate displacement direction, preferably perpendicular thereto and coinciding with a sensing direction of said further transducer,
   sensing signals produced by said further transducer and, if said signals are below a predetermined value, displacing said robot arm in said superordinate displacement direction, and if said signals from said further transducer are above a predetermined value, changing direction of movement of said robot arm from said superordinate displacement direction to said subordinate displacement direction.

9. The method of claim 8 which includes the further steps of, during displacement of said robot arm in said subordinate displacement direction,
   sensing signals produced by said at least one transducer and altering said robot arm displacement direction to said superordinate displacement direction if said signals are above a predetermined value.

10. The method of claim 9 which includes the further steps of:
    correcting displacement of said robot arm during displacement in said superordinate direction in said subordinate direction in accordance with signals produced by said further transducer, and,
    correcting displacements of said robot arm during movement in said subordinate displacement direction in said superordinate direction in accordance with signals provided by said at least one transducer.

11. The method of claim 8 which comprises the further steps of:
    changing displacement direction of said robot arm from said superordinate displacement to said subordinate displacement direction if deviations sensed by said at least one transducer exceed a predetermined value, and changing displacement direction of said robot arm from said subordinate displacement direction to said superordinate displacement direction if deviations sensed by said further transducer exceed a predetermined value.

12. The method of claim 8 which includes the further steps of:
terminating displacement of said robot arm when movement through a predetermined distance has been completed or when said arm has returned to its initial position.

13. Apparatus for controlling movement of a movable arm of an industrial robot with more than one degree of freedom in robot system coordinates, including at least one transducer for sensing deviation in a definite sensing direction for each such transducer wherein axes of said robot system coordinates are each different from each of said sensing directions, comprising:
a memory for storing coordinates of said robot arm for controlling subsequent movement of said arm,
means for positioning said arm in one position within an intended operating range,
means for displacing said robot arm a distance in a direction with at least a component in said sensing direction of said at least one transducer,
means for storing coordinates of said displacement in robot system coordinates in said memory,
arithmetic processing means coupled to at least one transducer and responsive to signals therefrom, and further coupled to said memory means and responsive to selected stored coordinates for calculating desired changes in robot coordinates in said robot system of coordinates, and
means for displacing said robot arm in accordance with computations of said arithmetic processing means.

14. The apparatus of claim 13 for controlling said arm in a principal direction of displacement, said sensing direction of said at least one transducer substantially coinciding with said principal displacement direction which further includes:
means for terminating movement of said robot arm if a signal from said at least one transducer exceeds a predetermined value.

15. The apparatus of claim 13 for controlling said robot arm for tracking a complex contour in a plane defined by a superordinate displacement direction and a subordinate displacement direction, different from said superordinate displacement direction, in which said sensing direction of said at least one transducer coincides with said superordinate direction and further including a second transducer sensing deviations in a sensing direction coinciding with said subordinate direction,
means for controlling displacement direction responsive to output signals of said transducers, for changing displacement direction from a first displacement direction to a second displacement direction when one of said transducers, sensing deviations in said first direction, senses a deviation exceeding a predetermined value.

16. The apparatus of claim 15 in which said contour is three-dimensional and which further includes a third transducer for sensing deviations in a direction which has a component perpendicular to said plane defined by said subordinate and superordinate displacement directions, said third transducer coupled to said arithmetic processing means for processing corrections to robot coordinates in said sensing direction of said third transducer, whereby said means for displacing said robot arm displaces said arm in accordance with corrections computed by said arithemetic processing means.

17. A method for controlling movement, for tracking a complex contour, of an industrial robot with an arm movable with more than one degree of freedom, and with first and second transducers for sensing deviations of said arm in a definite sensing direction for each transducer, comprising the steps of:
storing coordinates for two points defining superordinate displacement of said robot arm, in which the sensing direction of said first transducer has a component in said superordinate displacement direction;
storing coordinates for two further points defining a subordinate displacement of said robot arm in a direction which differs from said superordinate displacement direction, preferably perpendicular thereto, and coinciding with a sensing direction of said second transducer;
sensing signals produced by said second transducer, and, if said signals are below a predetermined value, displacing said robot arm in said superordinate displacement direction, and if said signals from said second transducer are above a predetermined value, changing direction of movement of said robot arm from said superordinate displacement direction to said subordinate displacement direction.

18. The method of claim 17 which includes the further steps of, during displacement of said robot arm in said subordinate displacement direction, sensing signals produced by said first transducer and altering said robot arm displacement direction to said superordinate displacement direction if said signals are above a predetermined value.

19. The method of claim 18 which includes the further steps of:
correcting displacememt of said robot arm during displacement in said superordinate direction in said subordinate direction in accordance with signals produced by said second transducer, and
correcting displacements of said robot arm during movement in said subordinate displacement direction in said superordinate direction in accordance with signals provided by said first transducer.

20. The method of claim 17 which comprises the further steps of:
changing displacement direction of said robot arm from said superordinate displacement to said subordinate displacement direction if deviations sensed by said first transducer exceed a predetermined value, and
changing displacement direction of said robot arm from said subordinate displacement direction to said superordinate displacement direction if deviations sensed by said second transducer exceed a predetermined value.

21. The method of claim 17 which includes the further step of terminating displacement of said robot arm when movement through a predetermined distance has been completed or when said arm has returned to its initial position.

22. Apparatus for controlling movement of a movable arm of an industrial robot for tracking a complex contour in a plane defined by a superordinate displacement direction and a subordinate displacement direction, different from said superordinate displacement direction, said robot arm having more than one degree of freedom and including first and second transducers for sensing deviations in a definite sensing direction for each such transducer, in which said sensing direction of said first transducer has a component in said superordinate direction and in which said sensing direction of said second transducer has a component in said subordinate direction; means for controlling displacement direction responsive to output signals of said transducers, for changing displacement direction from a first displacement direction to a second displacement direction when one of said transducers senses a deviation exceeding a predetermined value.

* * * * *